United States Patent
Kamata et al.

(10) Patent No.: US 10,697,946 B2
(45) Date of Patent: Jun. 30, 2020

(54) DATA PROCESSING SYSTEM AND DATA PROCESSING METHOD FOR CHROMATOGRAPH

(71) Applicant: SHIMADZU CORPORATION, Kyoto-shi, Kyoto (JP)

(72) Inventors: Etsuho Kamata, Kameoka (JP); Toshinobu Yanagisawa, Kyoto (JP); Yasuhiro Mito, Kyotanabe (JP); Kenichi Mishima, Kameoka (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 35 days.

(21) Appl. No.: 14/908,248

(22) PCT Filed: Jul. 29, 2013

(86) PCT No.: PCT/JP2013/070494
§ 371 (c)(1),
(2) Date: Jan. 28, 2016

(87) PCT Pub. No.: WO2015/015555
PCT Pub. Date: Feb. 5, 2015

(65) Prior Publication Data
US 2016/0169849 A1    Jun. 16, 2016

(51) Int. Cl.
*G01N 30/86* (2006.01)

(52) U.S. Cl.
CPC .............................. *G01N 30/8651* (2013.01)

(58) Field of Classification Search
CPC .... G01N 30/84; G01N 30/86; G01N 30/8613; G01N 30/862; G01N 30/8624; G01N 30/8631; G01N 30/8644; G01N 30/8651
See application file for complete search history.

(56) References Cited

U.S. PATENT DOCUMENTS

| 4,367,041 A | 1/1983 | Webb, Jr. et al. |
| 4,941,101 A * | 7/1990 | Crilly ................. G01N 30/8624 |
| | | 702/32 |

(Continued)

FOREIGN PATENT DOCUMENTS

| JP | 57127849 A | * 8/1982 | ............. G01N 30/86 |
| JP | 2011-153966 A | 8/2011 | |

(Continued)

OTHER PUBLICATIONS

Agilent, "Agilent OpenLAB and Agilent EZChronn Elite, PDA Analysis" (2007): pp. 1-55 (retrieved from https://www.agilent.com/cs/library/usermanuals/Public/PDA1.pdf) (Year: 2007).*

(Continued)

*Primary Examiner* — Michele Fan
(74) *Attorney, Agent, or Firm* — Sughrue Mion, PLLC

(57) ABSTRACT

A system for creating a chromatogram based on a temporal change of a spectrum obtained within a predetermined wavelength range including a target wavelength, the system including a post-correction chromatogram display section for displaying a post-correction chromatogram obtained by multiplying a chromatogram at the designated wavelength by a sensitivity factor obtained by dividing the intensity of the designated-time spectrum at the target wavelength by the intensity of the designated-time spectrum at the designated wavelength, and for changing the display to a post-correction chromatogram corresponding to the latest values of the designated time point and the designated wavelength when one or both of the designated time point and the designated wavelength are changed.

7 Claims, 5 Drawing Sheets

(56) References Cited

U.S. PATENT DOCUMENTS

| | | | | |
|---|---|---|---|---|
| 5,203,992 | A * | 4/1993 | Drouen | G01N 30/34 210/198.2 |
| 2004/0064299 | A1 * | 4/2004 | Mark | G01N 21/274 703/13 |
| 2004/0084613 | A1 * | 5/2004 | Bateman | H01J 49/0027 250/281 |
| 2006/0125826 | A1 * | 6/2006 | Lubkowitz | G01N 30/8675 345/440 |
| 2006/0255258 | A1 | 11/2006 | Wang et al. | |
| 2007/0101273 | A1 * | 5/2007 | Lin | G06F 19/708 715/738 |
| 2008/0237457 | A1 * | 10/2008 | Yamashita | G01N 30/8665 250/281 |
| 2009/0147005 | A1 * | 6/2009 | Kincaid | G06T 11/206 345/440 |
| 2009/0179147 | A1 * | 7/2009 | Milgram | G01N 30/8651 250/282 |
| 2010/0050737 | A1 * | 3/2010 | Wolters | G01N 30/8665 73/23.22 |
| 2011/0226943 | A1 * | 9/2011 | Rather | H01J 49/0036 250/282 |
| 2012/0089344 | A1 * | 4/2012 | Wright | G01J 3/28 702/32 |
| 2012/0116689 | A1 * | 5/2012 | Heinje | G06F 19/707 702/25 |
| 2014/0257712 | A1 | 9/2014 | Mito et al. | |
| 2016/0155621 | A1 * | 6/2016 | Denny | H01J 49/40 702/189 |

FOREIGN PATENT DOCUMENTS

| | | |
|---|---|---|
| WO | 2012/073322 A1 | 6/2012 |
| WO | 2013/035639 A1 | 3/2013 |

OTHER PUBLICATIONS

Ritsuo Hosokawa, "The Ministry of Health, Labor and Welfare Ministerial Notification No. 65", The Japanese Pharmacopoeia, Sixteenth Edition, [online], Mar. 24, 2011 [accessed on Jun. 21, 2013], the Internet; pp. 1-2319.

International Search Report for PCT/JP2013/070494, dated Nov. 5, 2013. [PCT/ISA/210].

Michael D. Bond et. al., "Evaluation of a Dual-Wavelength Size Exclusion HPLC Method With Improved Sensitivity to Detect Protein Aggregates and Its Use to Better Characterize Degradation Pathways of an IgG1 Monoclonal Antibody," Journal of Pharmaceutical Sciences, vol. 99, No. 6, Jun. 2010, pp. 2582-2597.

Written Opinion for PCT/JP2013/070494 dated Nov. 5, 2013. [PCT/ISA/237].

Communication dated Oct. 24, 2019 from the Intellectual Property India in counterpart IN Application No. 201647004798.

* cited by examiner

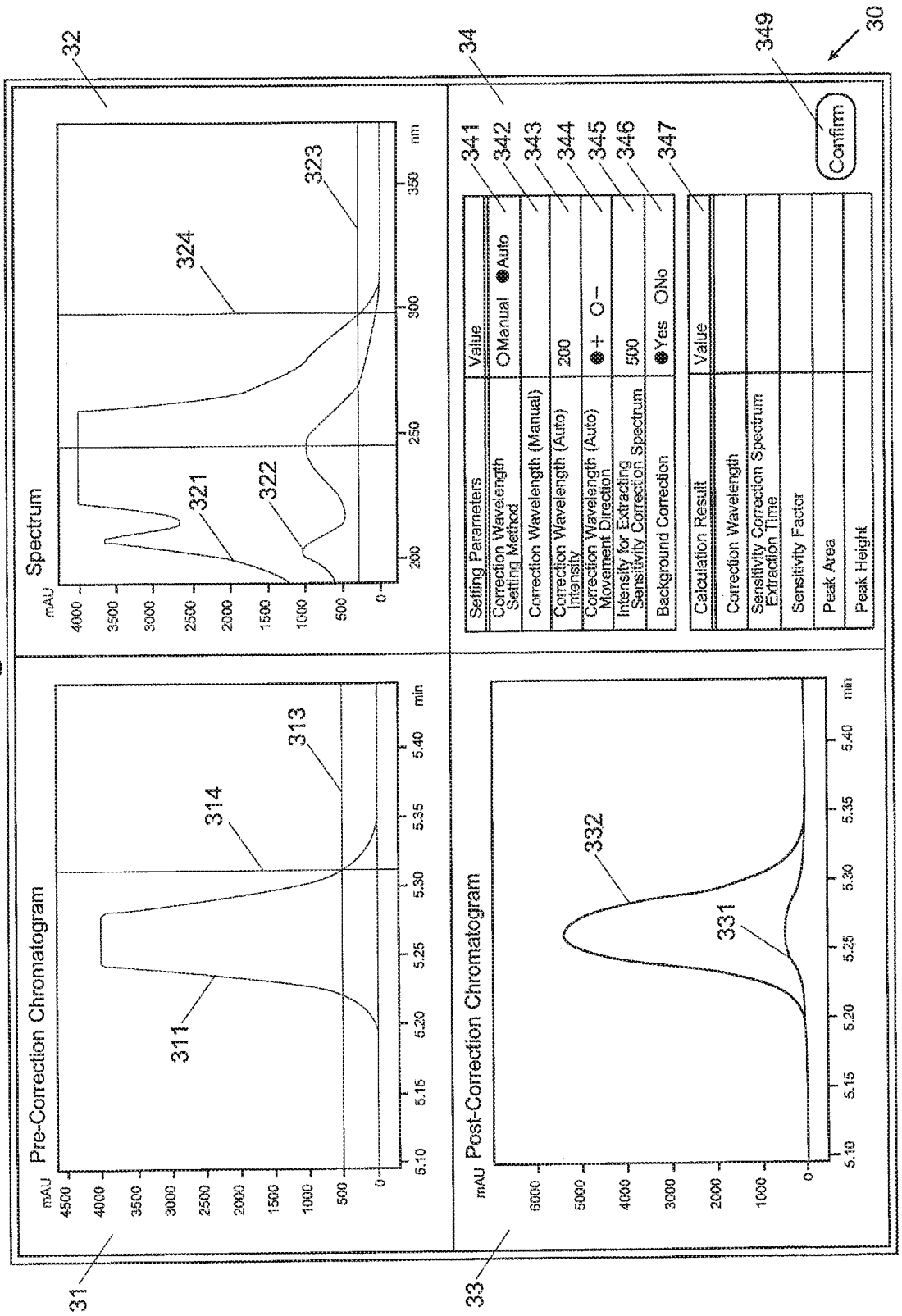

DATA PROCESSING SYSTEM AND DATA PROCESSING METHOD FOR CHROMATOGRAPH

CROSS REFERENCE TO RELATED APPLICATIONS

This application is a National Stage of International Application No. PCT/JP2013/070494 filed Jul. 29, 2013, the contents of all of which are incorporated herein by reference in their entirety.

TECHNICAL FIELD

The present invention relates to a data processing system and data processing method for a chromatograph system, such as a liquid chromatograph or gas chromatograph.

BACKGROUND ART

In a chromatograph apparatus, a set of data which represents a chromatogram with the horizontal axis indicating the time and the vertical axis indicating the signal intensity (e.g. output voltage) are obtained by analyzing a sample (such data are hereinafter called the "chromatogram data"). A data processing system for a chromatograph detects a peak appearing on such a chromatogram, identifies a substance corresponding to the peak from the peak position (retention time) with reference to a previously set identification table, and calculates the concentration and/or quantity of the substance from the height and/or area of the peak.

Such a data processing system normally has limits on the magnitude of the signal that can be processed, due to hardware limitations of the signal-processing circuits including an A/D converter. The system cannot correctly perform calculations if the magnitude of the input signal is higher than the upper limit or lower than the lower limit.

Besides such a limitation related to signal processing, there is a problem that the reliability of the detection result obtained with a detector of a chromatograph apparatus varies with the signal level of the detector. For example, in a device used as a detector for a liquid chromatograph (such as an ultraviolet-visible spectrophotometer or photodiode array detector), if the concentration of the component in the sample is too low, the accuracy of the quantitative determination deteriorates due to the influence of noise in the detection signal. Conversely, if the component concentration is too high, the non-linearity of the signal intensity becomes noticeable, so that the accuracy of the quantitative determination similarly deteriorates. Accordingly, when an analysis is performed with a conventional chromatograph apparatus, the sample needs to be appropriately diluted so that the component concentrations in the sample will be included in a predetermined range (dynamic range).

CITATION LIST

Non Patent Literature

Non Patent Literature 1: The Japanese Pharmacopoeia, Sixteenth Edition, [online], Mar. 24, 2011, The Ministry of Health, Labor and Welfare, [accessed on Jun. 21, 2013], the Internet

SUMMARY OF INVENTION

Technical Problem

In the case where the sample contains a plurality of components to be analyzed, if the concentrations of those components are not significantly varied, the analysis parameters (e.g. the concentration of the sample and the sensitivity of the detector) only need to be set so that all of the target components will be included in the dynamic range. By contrast, if there is a considerable difference in the concentration among the target components, it s impossible to correctly perform the analysis by any setting, since setting the parameters for correctly detecting the lowest-concentration component (impurity) causes deformation or saturation of the signal of the highest-concentration component (principal component), while setting the parameters for correctly detecting the highest-concentration component (principal component) causes the lowest-concentration component (impurity) to be obscured by noise.

For example, the Japanese Pharmacopeia, Sixteenth Edition (Non-Patent Literature 1) includes a section titled "Acetylcysteine: Purity Test (6) Related Substances" (pp. 311-312 in the Japanese version, or pp. 322-323 in the English version), which states that, as compared to the peak area of acetylcysteine, the area of each of the peaks other than acetylcysteine should not exceed 0.3% and the total area of the peaks should not exceed 0.6% in a test performed with a liquid chromatograph using an ultraviolet absorptiometer with the measurement wavelength set at 220 nm. In the case where there is such a large difference in concentration, if the sample is prepared with a high level of overall concentration (i.e. a low dilution ratio) in order to correctly determine the peak areas of the low-concentration components other than acetylcysteine, the signal of acetylcysteine will be deformed or saturated.

Such a situation has conventionally been addressed (i) by performing an analysis on each of a plurality of samples prepared with different concentrations, and correcting the obtained results according to their dilution ratios to determine the concentrations (or ratios of concentration) of the target components, or (ii) by setting two cells having different optical path lengths in two detectors, respectively, and performing an optical-path-length correction to determine the concentrations (or ratios of concentration) of the target components by a single analysis. However, method (i) is inefficient since it requires a considerable amount of time for the measurement, while method (ii) increases the device cost since it requires an additional detector.

The problem to be solved by the present invention is to provide a data processing system and data processing method for a chromatograph in which the data processing can be performed by a single analysis using a single detector, without being influenced by the noise in the detection signal or the non-linearity of the detection signal.

Solution to Problem

The data processing system for a chromatograph according to the present invention developed for solving the previously described problem is a data processing system for a chromatograph for creating a chromatogram based on a temporal change of a spectrum obtained within a predetermined wavelength range including a target wavelength, the system including:

a) a data storage section for storing data of the spectrum for each retention time;

b) a pre-correction chromatogram display section for creating and displaying a pre-correction chromatogram which is a chromatogram at the target wavelength, based on the data retrieved from the data storage section;

c) time-designating section for allowing a user to designate, within a peak of the pre-correction chromatogram, a time point different from the retention time of a peak top;

d) a spectrum display section for displaying a peak-top spectrum which is the spectrum at the retention time of the peak top in the pre-correction chromatogram and a designated-time spectrum which is the spectrum at the designated time point, based on the data retrieved from the data storage section;

e) a wavelength-designating section for allowing a user to designate within the aforementioned wavelength range, a wavelength different from the target wavelength; and f) a post-correction chromatogram display section for displaying a post-correction chromatogram obtained by multiplying a chromatogram at the designated wavelength by a sensitivity factor obtained by dividing the intensity of the designated-time spectrum at the target wavelength by the intensity of the designated-time spectrum at the designated wavelength, and for changing the display to a post-correction chromatogram corresponding to the latest values of the designated time point and the designated wavelength when one or both of the designated time point and the designated wavelength are changed.

Spectra of a component have a shape specific to that component. Therefore, if neither deformation nor saturation occurs, the spectra of the component obtained at any retention times within a chromatogram peak formed by that component are similar to each other in shape, and only their intensities are different from each other. Due to this similarity in the spectrum shape, it is possible to consider that a chromatogram created at one wavelength belonging to one spectrum peak should have an intensity proportional to the intensity of the spectrum at that wavelength. Accordingly, the data processing system a chromatograph according to the present invention performs the operation of multiplying the chromatogram at a designated wavelength by the "sensitivity factor" which is the intensity of the designated-time spectrum at the target wavelength divided by that of the designated-time spectrum at the designated wavelength, i.e. the ratio of the intensity of the designated-time spectrum at the target wavelength to the intensity of the same spectrum at the designated wavelength. Due to the aforementioned similarity in shape, such an intensity ratio of the spectrum is equal to the intensity ratio between the chromatogram at the target wavelength (i.e. the pre-correction chromatogram) and the chromatogram at the designated wavelength. Therefore, the intensity of the post-correction chromatogram is equal to that of the true chromatogram (with no deformation or saturation) at the target wavelength. Thus, even if the spectrum is deformed or saturated at retention times near the peak top of the chromatogram, and consequently, the peak of the pre-correction chromatogram is deformed or saturated, a chromatogram in which the deformation or saturation is corrected can be obtained with the same intensity as the chromatogram at the target wavelength by allowing the user to designate a time and wavelength at which such a saturation has not occurred.

Since a chromatogram with the deformation or saturation corrected can be obtained in this manner, a measurement of a sample in which a high-concentration principal component is mixed with impurities or other low-concentration components can be correctly performed by increasing the entire concentration of the sample (or decreasing the dilution ratio) s as to enable an analysis of the impurities (or other components). Even if the chromatogram corresponding to the principal component is deformed or saturated due to the increase in the entire concentration of the sample, the problem can be corrected in the previously described manner, so that the data processing can be performed for both the principle component and the impurities (or other components) by a single analysis using a single detector, without being influenced by the noise in the detection signal (deformation) or the non-linearity of the detection signal (saturation).

In the data processing system for a chromatograph according to the present invention, when a user changes the designated time and/or designated wavelength, the displayed post-correction chromatogram is renewed according to that change. Therefore, by sequentially changing the designated time and/or designated wavelength, the user can visually understand how the post-correction chromatogram changes. By this operation, the user can appropriately modify the chromatogram so as to maximize the intensity of the post-correction chromatogram within a range where neither the deformation nor saturation of the post-correction chromatogram occurs.

The task of designating the time through the time-designating section may be performed by entering a numerical value using a keyboard or by designating a position within an image displayed by the pre-correction chromatogram display section using a mouse or similar device. In the latter case, the value on the time axis (horizontal axis) of the chromatogram corresponding to the designated position is adopted as the designated time. It is also possible to specify an intensity of the chromatogram by entering a numerical value using a keyboard or by designating a position within an image displayed by the pre-correction chromatogram display section using a mouse or similar device, and to set the retention time corresponding to the specified intensity as the designated time. In this case, the retention time corresponding to the specified intensity of the chromatogram can exist on both sides of the peak top of the chromatograph. To deal with this situation, it is preferable to previously determine whether the point in time earlier or later than the retention time of the peak top should be adopted as the designated time. The task of designating the wavelength through the wavelength-designating section can also be performed in a similar manner, i.e. by entering a numerical value using a keyboard, by designating a position on an image displayed by the spectrum-displaying section (and adopting the value on the horizontal axis corresponding to that position as the designated wavelength), or by specifying an intensity of the spectrum (using a keyboard, mouse or similar device).

The data processing method for a chromatograph according to the present invention is a method for creating a chromatogram based on a temporal change of a spectrum obtained within a wavelength range including a target wavelength, the method including the steps of:

creating a pre-correction chromatogram which is a chromatogram at the target wavelength, based on data of the spectrum obtained for each retention time;

designating, within a peak of the pre-correction chromatogram, a time point different from the retention time of a peak top;

designating, within the aforementioned wavelength range, a wavelength different from the target wavelength; and creating a post-correction chromatogram by multiplying a chromatogram at the designated wavelength by a sensitivity factor obtained by dividing the intensity at the target wavelength of a designated-time spectrum which is a spectrum at the designated time point by the intensity at the designated wavelength of the designated-time spectrum, and creating a post-correction chromatogram corresponding to the latest values of the designated time point and the designated wavelength when one or both of the designated time point and the designated wavelength are changed.

Advantageous Effects of the Invention

With the present invention, it is possible to process data obtained by an analysis using a chromatograph, by a single analysis using a single detector and without being influenced by the noise in the detection signal or the non-linearity of the detection signal.

BRIEF DESCRIPTION OF DRAWINGS

FIG. 3 shows one example of the data processing window displayed on a display unit of the data processing system for a chromatograph of the present embodiment.

DESCRIPTION OF EMBODIMENTS

One embodiment of the data processing system and method for a chromatograph according to the present invention is hereinafter described using FIGS. 1-5. The following description deals with the case of a liquid chromatograph (LC). It should be noted that the description similarly applies in the case of a gas chromatograph.

Embodiment

Figure 1:
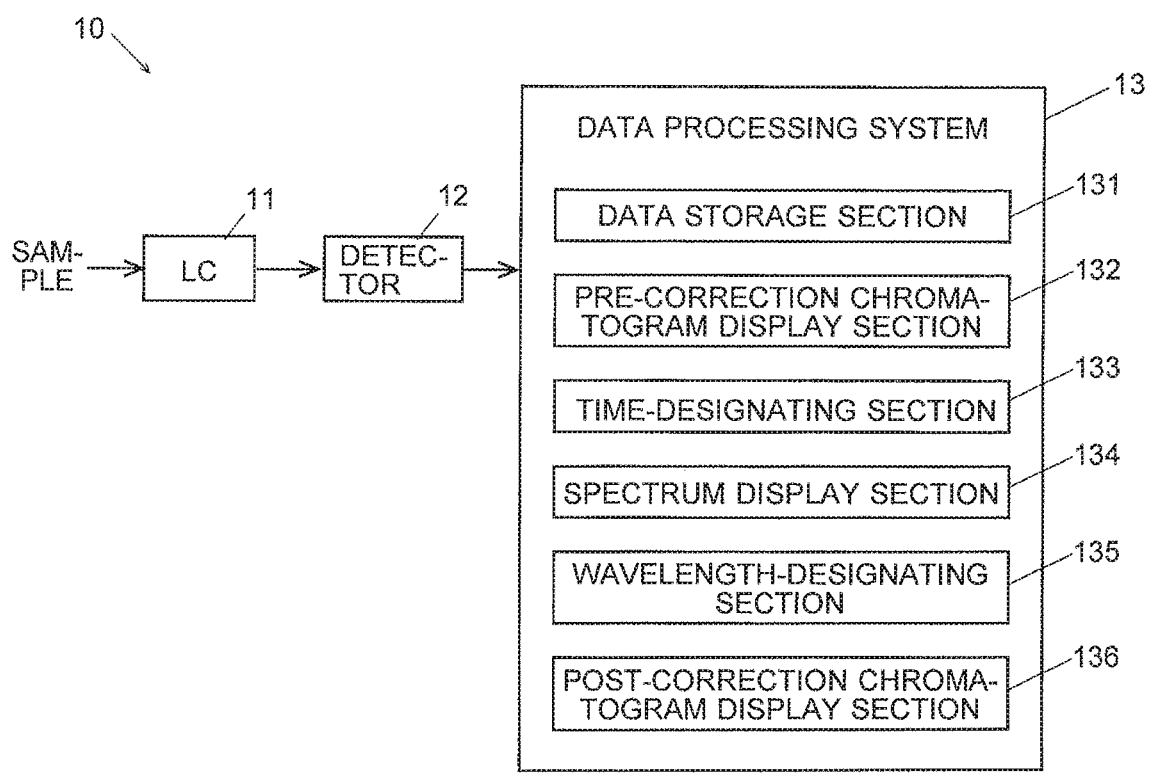
FIG. 1 is a schematic configuration diagram of an analyzing system including a data processing system for a chromatograph according to the present invention.

The data processing system for a chromatograph of the present embodiment constitutes a portion of the analyzing system 10 shown in FIG. 1. The analyzing system 10 has an LC 11 for temporally separating the components contained in a liquid sample, a detector 12 for analyzing the separated components within a predetermined wavelength band, and a data processing system 13 (the system of the present embodiment) for processing data produced by the detector 12. The data processing system 13 consists of a computer (hardware) with a dedicated data-processing software program installed, the computer being a commonly used computer having a CPU (central processing, storage device (a memory, hard disk, solid-state drive and/or other devices), display unit, input device (a keyboard, mouse and other devices) and other components. The data processing system 13 functions as a data storage section 131, pre-correction chromatogram display section 132, time-designating section 133, spectrum display section 134, wavelength-designating section 135, and post-correction chromatogram display section 136.

Figure 2:
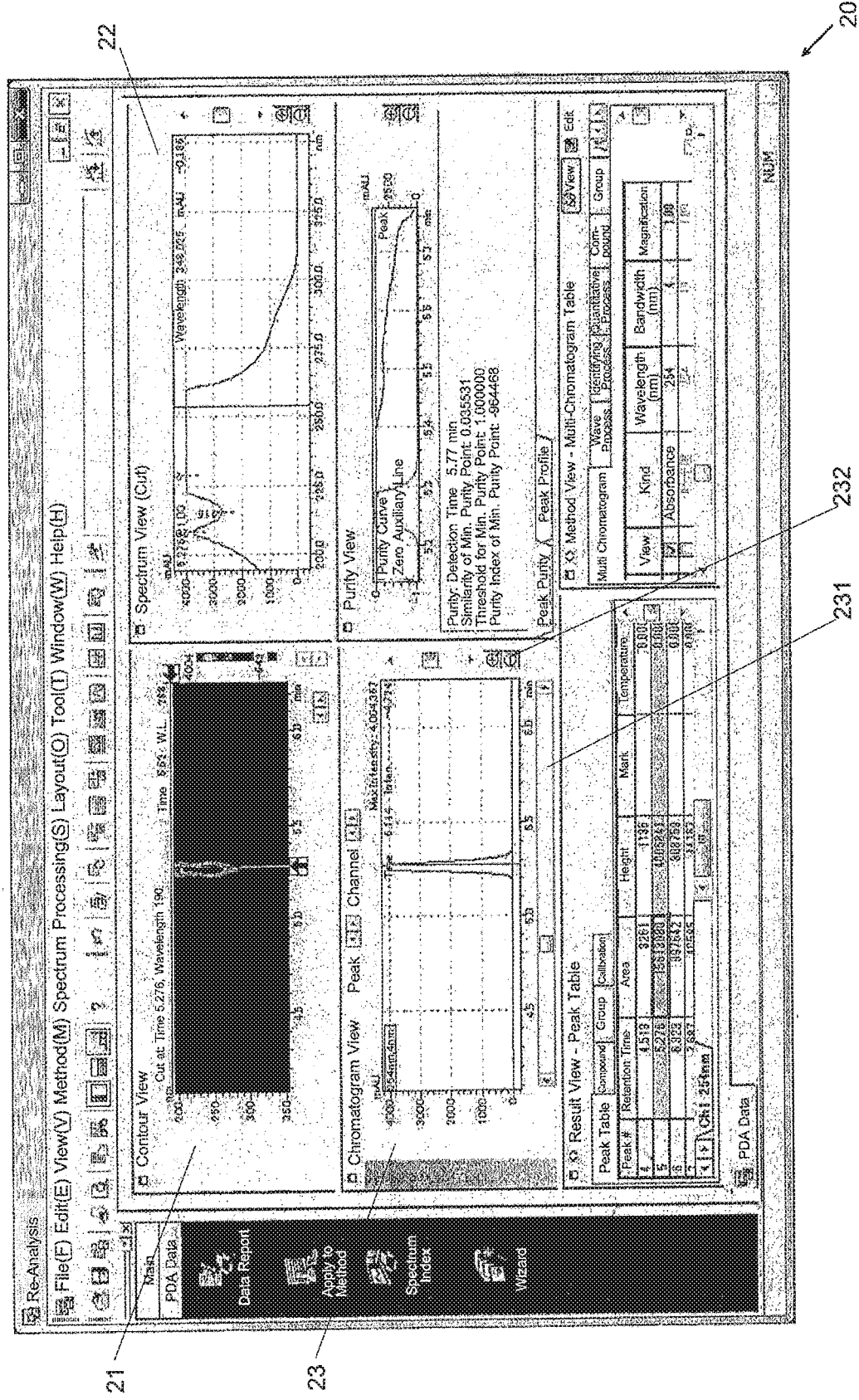
FIG. 2 shows one example of the main window displayed on a display unit of the data processing system for a chromatograph of the present embodiment.

The display unit of the e data processing system 13 displays either the main window 20 shown in FIG. 2 or the data processing window 30 shown in FIG. 3. If the screen of the display unit 13 is large enough, both windows may be simultaneously displayed. The main window 20 includes: a contour view 21 showing the signal intensity of the detector 12 by contour lines on a graph with the horizontal axis indicating time and the vertical axis indicating the wavelength of the light detected with the detector 12; a spectrum view 22 showing a spectrum taken at a specific point in time; a chromatogram view 23 showing a chromatogram at a specific wavelength created from the spectrum data; and other information. In the chromatogram view 23, the displayed range of the horizontal axis (i.e. time axis) can be changed (without changing the time width) by moving a slide bar 231 for the horizontal axis. The chromatogram can also be zoomed (with a corresponding change of the time width displayed in the time-axis direction) by clicking the two icons 232 with the symbols of "+" and "−" shown at the center of the picture of a magnifier. The display can be switched to the data processing window 30 by a predetermined operation, such as clicking a specific icon on the main window 20 or selecting a specific item from the "Window (W)" pulldown menu.

The data processing window 30 is divided into four small areas: a pre-correction chromatogram display area 31, a spectrum display area 32, a post-correction chromatogram display area 33, and a setting-parameter calculation-result display area 34.

In the pre-correction chromatogram display area 31, the chromatogram already displayed in the chromatogram view 23 (pre-correction chromatogram 311) is shown within the range of the horizontal axis time range) specified in the chromatogram view 23, with the range of the vertical axis adjusted so as to show the entire pre-correction chromatogram 311. In the example shown in FIG. 2, the pre-correction chromatogram 311 is saturated at its peak top. Also shown in the pre-correction chromatogram display area 31 are a horizontally extending auxiliary line 313 for setting the chromatogram intensity corresponding to the designated time and a vertically extending auxiliary line 314 for setting the designated time. These two auxiliary lines c be independently dragged with the mouse; the horizontal auxiliary line 313 for setting the chromatogram intensity corresponding to the designated time can be moved vertically, and the vertical auxiliary line 314 for setting the designated time can be moved horizontally. Moving one of the auxiliary lines produces an interlocked movement of the other line, making this line always pass through the intersection of the former line and the pre-correction chromatogram 311. As opposed to the present example which has two auxiliary lines, the system may be configured to show only one of the two auxiliary lines, or those auxiliary lines may be omitted if the system has the function of allowing users to numerically enter the designated time on the setting-parameter calculation-result display area 34 (as will be described later).

In the spectrum display area 32, a peak-top spectrum 321, which is the spectrum taken at the time of the peak top of the pre-correction chromatogram 311, and a designated-time spectrum 322, which is the spectrum taken at the designated time (which will be described later) are shown. Also shown in the spectrum display area 32 are a horizontally extending auxiliary line 323 for setting the spectrum intensity corresponding to the designated wavelength and a vertically extending auxiliary line 324 for setting the designated wavelength. Similarly to the two auxiliary lines displayed in the pre-correction chromatogram display area 31, the two auxiliary lines in the spectrum display area 32 can also be dragged with the mouse, with the two lines moving in an interlocked fashion. The aforementioned other variations are similarly applicable, i.e. the system may be configured to show only one of the two auxiliary lines, or those auxiliary lines may be omitted if the system has the function of allowing users to numerically enter the designated wavelength on the selling-parameter calculation-result display area 34.

In the post-correction chromatogram display area 33, a chromatogram 331 and post-correction chromatogram 332 at the designated wavelength (correction wavelength) are shown, which are obtained in a manner to be described later.

The setting-parameter calculation-result display area 34 shows a table for allowing users to enter numerical values or select buttons for various items of setting (which will be described later), and a table for showing numerical values of the calculated result used for correcting the chromatogram.

In these tables, the "Correction Wavelength Setting Method" field 341 has radio buttons for selecting the method of setting the designated wavelength (correction wavelength) from "Manual" and "Auto," "Manual" means that the designated wavelength should be manually entered in the "Correction Wavelength (Manual)" field 342 using the keyboard, while "Auto" means that, when the auxiliary line 323 for setting the spectrum intensity corresponding to the designated wavelength and/or the auxiliary line 324 for setting the designated wavelength is manually moved, the designated wavelength is automatically determined from the intersection of the peak-top spectrum 321 and the two auxiliary lines. The designated wavelength determined from the intersection is displayed in the "Correction Wavelength (Auto) Intensity" field 343. The "Correction Wavelength (Auto) Movement Direction" field 344 has radio buttons for selecting "+" (the intersection on the longer-wavelength side) or "−" (the intersection on the e shorter-wavelength side) to specify which intersection should be set as the correction wavelength when there are intersections of the auxiliary line 324 for setting the designated wavelength and the peak-top spectrum 321 on both sides of the peak top of this spectrum. The "Intensity for Extracting Sensitivity Correction Spectrum" field 345 is a field for manually entering the chromatogram intensity which corresponds to the "designated time", i.e. the time point at which the designated-time spectrum (sensitivity correction spectrum) 322 is to be extracted (this chromatogram intensity corresponds to the value on the vertical axis of the auxiliary line 313 for setting the chromatogram intensity corresponding to the designated time). Although the setting-parameter calculation-result display area 34 in this example has no field for directly entering the designated time, it is naturally possible to provide such a field. The "Background Correction" field 346 has radio buttons for specifying whether or not the background correction for the pre-correction chromatogram 311 and post-correction chromatogram 332 needs to be performed.

In the table 347 of the calculation result, the sensitivity factor, the peak area and peak intensity of the post-correction chromatogram 332 as well as other calculated results are displayed. Additionally, a "Confirm" button 349 to be clicked by users to complete the data processing is displayed in the setting-parameter calculation-result display area 34.

Figure 4A:
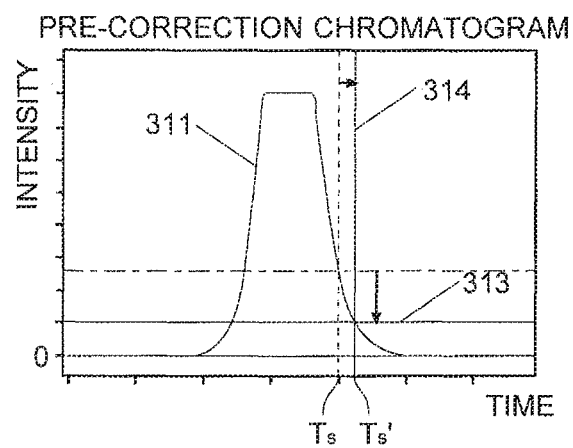
FIGS. 4A-4D show how the data processing window changes in the process of using the data processing system for a chromatograph of the present embodiment.
Figure 4B:
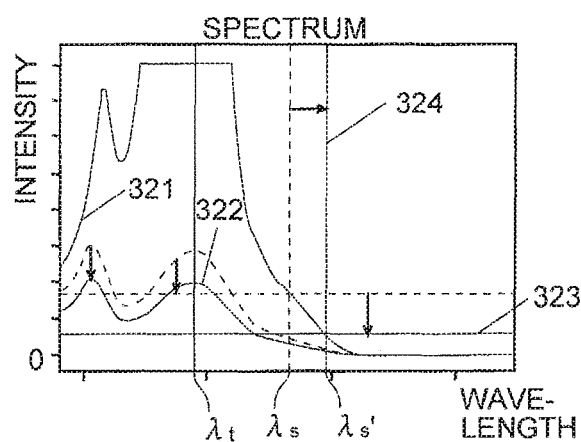
Figure 4C:
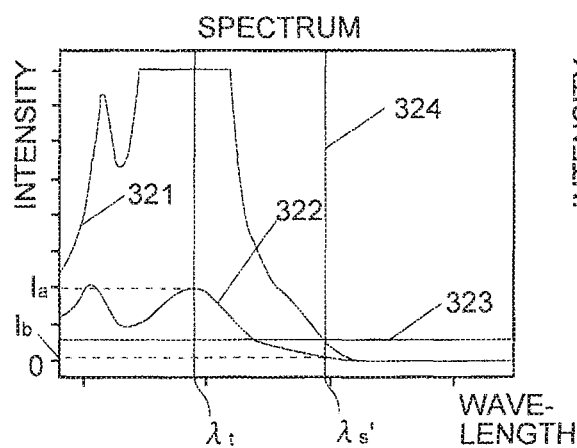
Figure 4D:
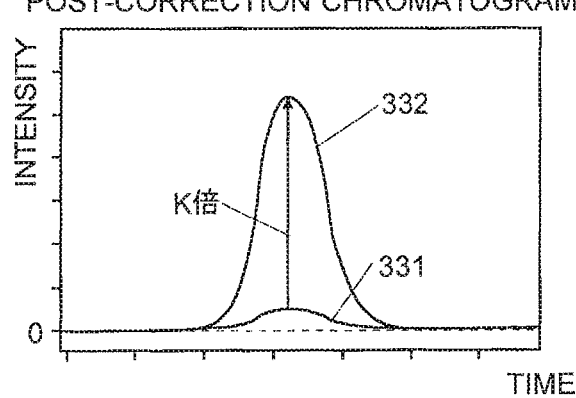
Figure 5:
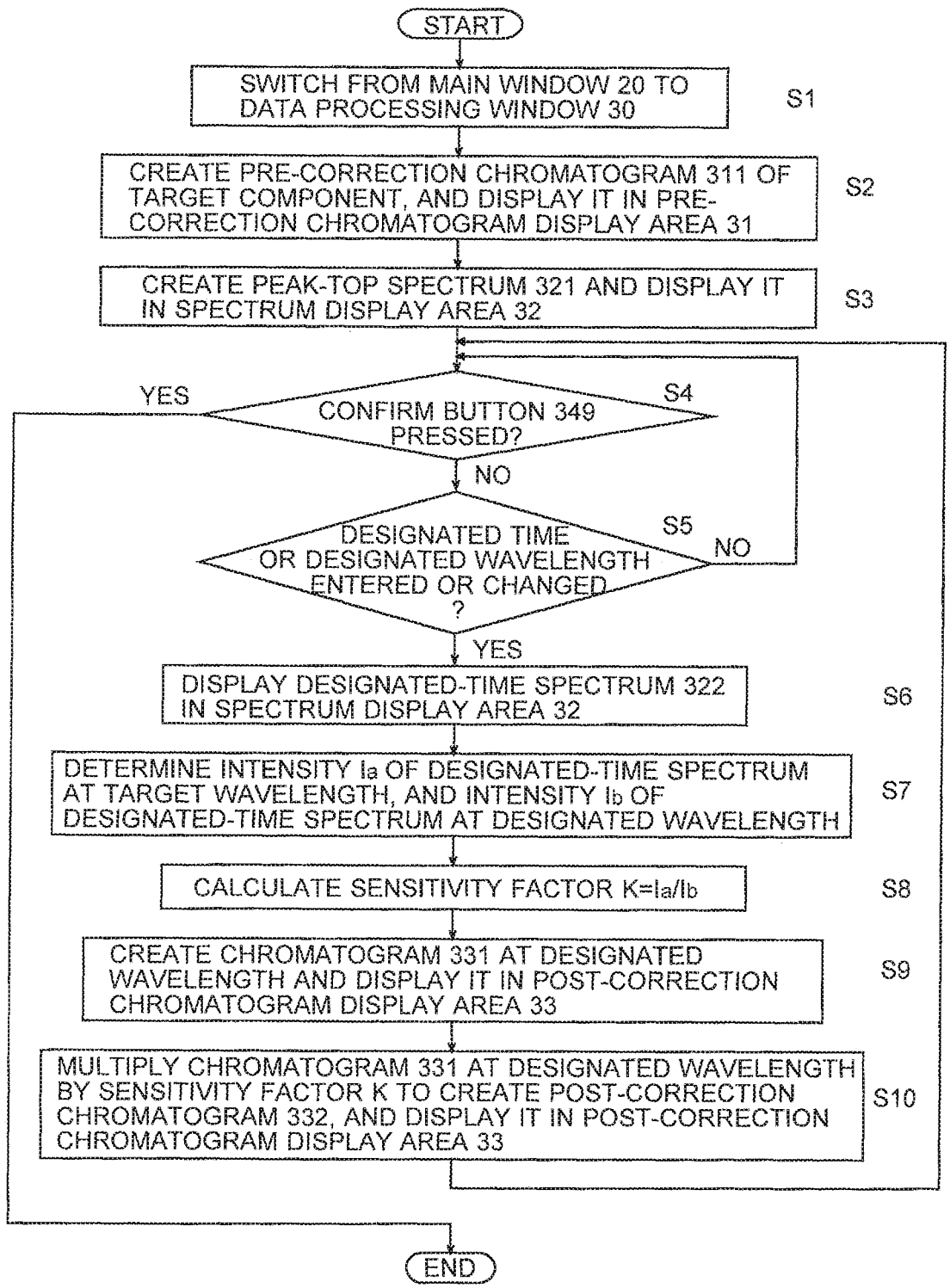
FIG. 5 is a flowchart showing an operation of the data processing system for a chromatograph of the present embodiment.

An operation of the data processing system for a chromatograph of the present embodiment (which is an embodiment of the data processing method for a chromatogram according to the present invention) is described using the drawings of the data processing window shown in FIGS. 3 and 4A-4D as well as the flowchart shown in FIG. 5.

Initially, the user performs the aforementioned predetermined operation on the main window 20 to switch the display from the main window 20 to the data processing window 30 (Step S1). Subsequently, the pre-correction chromatogram display section 132 creates and displays a pre-correction chromatogram 311 of the target component based on the data retrieved from the data storage section 131 (Step S2). The wavelength-designating section 135 creates a peak-top spectrum 321 to be referenced by the user when selecting the designated wavelength, and displays it in the spectrum display area 32 (Step S3). The pre-correction chromatogram 311 and peak-top spectrum 321 displayed in this manner remain unchanged until the confirm button 349 is pressed by the user. If the confirm button 349 is pressed by the user at this point, the system discontinues the process corresponding to the present invention and restores the main window 20, whereas the system proceeds to the next step if the confirm button 349 is not pressed (Step S4).

Subsequently, the system stands by until the designated time and/or the designated wavelength is entered or changed by the operator, and proceeds to the next step when such an entry or change has been made (Step S5). The entry of the designated time is performed in the previously described manner, i.e. by moving the auxiliary line 313 for setting the chromatogram intensity corresponding to the designated time and/or the auxiliary line 314 for setting the designated time in the pre-correction chromatogram display area 31 (FIG. 4A), or by entering a numerical value in the "Intensity for Extracting Sensitivity Correction Spectrum" field 345. In the example shown in FIG. 4A, the designated time is changed from $T_s$ to $T_s'$ by a downward movement of the auxiliary line 313 for setting the chromatogram intensity corresponding to the designated time or a rightward movement of the auxiliary line 314 for setting the designated time. The entry of the designated wavelength is also similarly performed by moving the auxiliary line 323 for setting the spectrum intensity corresponding to the designated wavelength and/or the auxiliary line 324 for setting the designated wavelength in the spectrum display area 32 (FIG. 4B), or by entering a numerical value in the "Correction Wavelength (Manual)" field 342 or the "Correction Wavelength (Auto) Intensity" field 343. In the example of FIG. 4B, the designated wavelength is changed from $\lambda_s$ to $\lambda_s'$.

When the designated time and/or the designated wavelength is entered or changed, the spectrum display section 134 creates a designated-time spectrum 322 for the newly designated time and displays it in the spectrum display area 32 together with the peak-top spectrum 321 (Step S6). In the example shown in FIG. 4B, according to the change in the designated time, the designated-time spectrum 322 is modified from the one shown by the broken line to the one shown by the solid line, with the intensity decreased entirely.

Next, the post-correction chromatogram display section 136 performs the following processes: initially, the intensity $I_a$ of the designated-time spectrum 322 at the target wavelength $\lambda_t$ (which is the wavelength of the peak top of the designated-time spectrum) and the intensity $I_b$ of the designated-time spectrum 322 at the modified designated wavelength are determined (Step S7; see FIG. 4C), and the sensitivity factor $K=I_a/I_b$ is calculated (Step S8). Then, the chromatogram 331 at the designated wavelength $\lambda_s'$ is created and displayed in the post-correction chromatogram display area 33 (Step S9). Additionally, the chromatogram 331 at the designated wavelength $\lambda_s'$ is multiplied by the sensitivity factor K, and the obtained chromatogram is displayed as the post-correction chromatogram 332 in the post-correction chromatogram display area 33 (Step S10; see FIG. 4D). Unlike the pre-correction chromatogram 311, the post-correction chromatogram 332 obtained in this manner is not saturated at its peak top.

After the processes described thus far, the system returns to Step S4 and repeats the processes of Steps S4 through S10 until the "Confirm" button 349 is pressed.

Needless to say, the previous embodiment is a mere example of the present invention and can be appropriately modified within the spirit of the present invention.

REFERENCE SIGNS LIST

10 . . . Analyzing System
11 . . . Liquid Chromatograph (LC)
12 . . . Detector
13 . . . Data Processing System
131 . . . Data Storage Section
132 . . . Pre-Correction Chromatogram Display Section
133 . . . Time-Designating Section
134 . . . Spectrum Display Section
135 . . . Wavelength-Designating Section
136 . . . Post-Correction Chromatogram Display Section
20 . . . Main Window
21 . . . Contour View
22 . . . Spectrum View
23 . . . Chromatogram View
231 . . . Slide Bar for Horizontal
232 . . . Icon
30 . . . Data Processing Window
31 . . . Pre-Correction Chromatogram Display Area
311 . . . Pre-Correction Chromatogram
313 . . . Auxiliary Line for Setting Chromatogram Intensity Corresponding to Designated Time
314 . . . Auxiliary Line for Setting Designated Time
32 . . . Spectrum Display Area
321 . . . Peak-Top Spectrum
372 . . . Designated-Time Spectrum
323 . . . Auxiliary Line for Setting Spectrum Intensity Corresponding to Designated Wavelength
324 . . . Auxiliary Line for Setting Designated Wavelength
33 . . . Post-Correction Chromatogram Display Area
331 . . . Chromatogram
332 . . . Post-Correction Chromatogram
34 . . . Selling-Parameter Calculation-Result Display Area
341 . . . "Correction Wavelength Setting Method" Field
342 . . . "Correction Wavelength (Manual)" Field
343 . . . "Correction Wavelength (Auto) Intensity" Field
344 . . . "Correction Wavelength (Auto) Movement Direction" Field
345 . . . "Intensity for Extracting Sensitivity Correction Spectrum" Field
346 . . . "Background Correction" Field
347 . . . Table of Calculation Result
349 . . . Confirm Button

The invention claimed is:

1. A chromatograph system comprising:
a chromatograph apparatus configured to separate components contained in a sample;
a detector configured to analyze the separated components within a predetermined wavelength range including a target wavelength;
a data processing system configured to process data produced by the detector to create a chromatogram based on a temporal change of a spectrum obtained by separating the components contained in the sample in the chromatograph apparatus and by analyzing the temporal change of the spectrum of the separated components within the predetermined wavelength range including the target wavelength, the data processing system comprising:

a) a data storage section configured to obtain data of the spectrum from the chromatograph apparatus and store the data of the spectrum for each retention time;
b) a pre-correction chromatogram display section configured to create and display a pre-correction chromatogram which is a chromatogram at the target wavelength, based on the data retrieved from the data storage section;
c) a time-designating section configured to allow a user to designate, within a peak of the pre-correction chromatogram, a time point different from a retention time of a peak top;
d) a spectrum display section configured to display a peak-top spectrum which is the spectrum at the retention time of the peak top in the pre-correction chromatogram and a designated-time spectrum which is the spectrum at the designated time point, based on the data retrieved from the data storage section;
e) a wavelength-designating section configured to allow a user to designate, within the predetermined wavelength range, a wavelength different from the target wavelength; and
f) a post-correction chromatogram display section including a processor configured to:
calculate a sensitivity factor obtained by dividing an intensity of the designated-time spectrum at the target wavelength by an intensity of the designated-time spectrum at the designated wavelength,
multiply a chromatogram at the designated wavelength that is different from the target wavelength by the sensitivity factor to create a post-correction chromatogram, and
display the post-correction chromatogram on a display unit.

2. The chromatograph system according to claim 1, wherein the time-designating section is configured so that the designated time is set upon designation of a position on an image displayed by the pre-correction chromatogram display section.

3. The chromatograph system according to claim 2, wherein the wavelength-designating section is configured so that the designated wavelength is set upon designation of a position on an image displayed by the spectrum-displaying section.

4. The chromatograph system according to claim 1, wherein the wavelength-designating section is configured so that, the designated wavelength is set upon designation of a position on an image displayed by the spectrum-displaying section.

5. The chromatograph system according to claim 1, wherein the post-correction chromatogram display section further changes the display unit to display the post-correction chromatogram corresponding to latest values of the designated time point and the designated wavelength when one or both of the designated time point and the designated wavelength are changed.

6. A method to create a chromatograph by a chromatograph system comprising a chromatograph apparatus, detector and data processing system, the method comprising:
separating components contained in a sample in the chromatograph apparatus;
analyzing the separated components within a predetermined wavelength range including a target wavelength in the detector;

processing data produced by the detector in the data processing system to create a chromatogram based on a temporal change of a spectrum obtained by separating the components contained in the sample in a chromatograph apparatus and by analyzing the temporal change of the spectrum of the separated components within the predetermined wavelength range including the target wavelength, the method comprising steps of:

creating a pre-correction chromatogram which is a chromatogram at the target wavelength, based on data of the spectrum obtained from the chromatograph apparatus for each retention time;

allowing a user to designate, within a peak of the pre-correction chromatogram, a time point different from a retention time of a peak top;

allowing a user to designate, within the predetermined wavelength range, a wavelength different from the target wavelength; and creating a post-correction chromatogram with a processor by:

calculating a sensitivity factor obtained by dividing an intensity of the designated-time spectrum at the target wavelength by an intensity of the designated-time spectrum at the designated wavelength, and multiplying a chromatogram at the designated wavelength that is different from the target wavelength by the sensitivity factor to create the post-correction chromatogram, and displaying the post-correction chromatogram on a display unit.

7. The method according to claim 6, wherein the method further comprises creating the post-correction chromatogram corresponding to latest values of the designated time point and the designated wavelength when one or both of the designated time point and the designated wavelength are changed.

* * * * *